(12) United States Patent
Durham (10) Patent No.: US 8,818,860 B2
(45) Date of Patent: Aug. 26, 2014

(54) PRIORITIZED DISTRIBUTION OF OFFER INFORMATION

(75) Inventor: Sharon Durham, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 541 days.

(21) Appl. No.: 12/568,870

(22) Filed: Sep. 29, 2009

(65) Prior Publication Data

US 2011/0078026 A1     Mar. 31, 2011

(51) Int. Cl.
*G06Q 30/00*     (2012.01)

(52) U.S. Cl.
USPC ............................................... 705/14.6

(58) Field of Classification Search
USPC ....................................... 705/1, 14
See application file for complete search history.

(56) References Cited

U.S. PATENT DOCUMENTS

| | | | |
|---|---|---|---|
| 6,108,639 A | 8/2000 | Walker et al. | |
| 6,594,640 B1 | 7/2003 | Postrel | |
| 7,057,591 B1 * | 6/2006 | Hautanen et al. | 345/87 |
| 7,571,106 B2 * | 8/2009 | Cao et al. | 705/1.1 |
| 2003/0216966 A1 | 11/2003 | Saenz et al. | |
| 2006/0178932 A1 | 8/2006 | Lang | |
| 2006/0209690 A1 * | 9/2006 | Brooke | 370/230 |
| 2007/0245351 A1 * | 10/2007 | Sussman et al. | 718/104 |
| 2009/0299849 A1 | 12/2009 | Cao et al. | |

OTHER PUBLICATIONS

Washington Capitals Homepage; Compare Full and Partial Season Ticket Plants on Nov. 6, 2007. Available at: http://web.archive.org/web/20071106041420/http://capitals.nhl.com/team/app/?service=page&page=NHLPage&id=17145.*

* cited by examiner

*Primary Examiner* — Matthew T Sittner
*Assistant Examiner* — Katherine Kolosowski-Gager
(74) *Attorney, Agent, or Firm* — Toler Law Group, PC (57) ABSTRACT

A computerized method is disclosed that includes automatically distributing first offer information to at least one first priority contact in a prioritized list of contacts. The first offer information is distributed in response to receiving a request to distribute an offer. The method also includes automatically distributing second offer information to at least one second priority contact in the prioritized list of contacts when a first time period expires.

22 Claims, 8 Drawing Sheets

PRIORITIZED DISTRIBUTION OF OFFER INFORMATION

FIELD OF THE DISCLOSURE

The present disclosure is generally related to prioritized distribution of offer information.

BACKGROUND

A contact list may store contact information associated with multiple contacts. An offer originator may distribute an initial offer to one or more contacts by manually selecting one or more contacts from the contact list. If none of the initially selected contacts respond to the initial offer within a desired period of time, the offer originator may elect to send a second offer to other contacts. Manual selection of the contacts from the contact list and tracking of multiple offers may be inconvenient for the offer originator.

DETAILED DESCRIPTION

In a particular embodiment, a computerized method is disclosed that includes automatically distributing first offer information to at least one first priority contact in a prioritized list of contacts. The first offer information is distributed in response to receiving a request to distribute an offer. The method also includes automatically distributing second offer information to at least one second priority contact in the prioritized list of contacts when a first time period expires.

In another particular embodiment, a computer-readable storage medium is disclosed that includes instructions that, when executed by a processor, cause the processor to initiate automatic distribution of first offer information to at least one first priority contact in a prioritized list of contacts in response to receiving a request to distribute an offer. The computer-readable storage medium also includes instructions that, when executed by the processor, cause the processor to initiate automatic distribution of second offer information to at least one second priority contact in the prioritized list of contacts when a first time period expires. In one embodiment, the first offer information is different from the second offer information.

In another particular embodiment, a system is disclosed that includes a priority contact component and an offer management component. The priority contact component is configured to store a prioritized list of contacts. The offer management component is configured to receive a request to distribute an offer. In response to the request, the offer management component is configured to automatically distribute first offer information to a plurality of first priority contacts in the prioritized list of contacts. The offer management component is also configured to automatically distribute second offer information to a second plurality of priority contacts in the prioritized list of contacts when a first time period expires.

Figure 1:
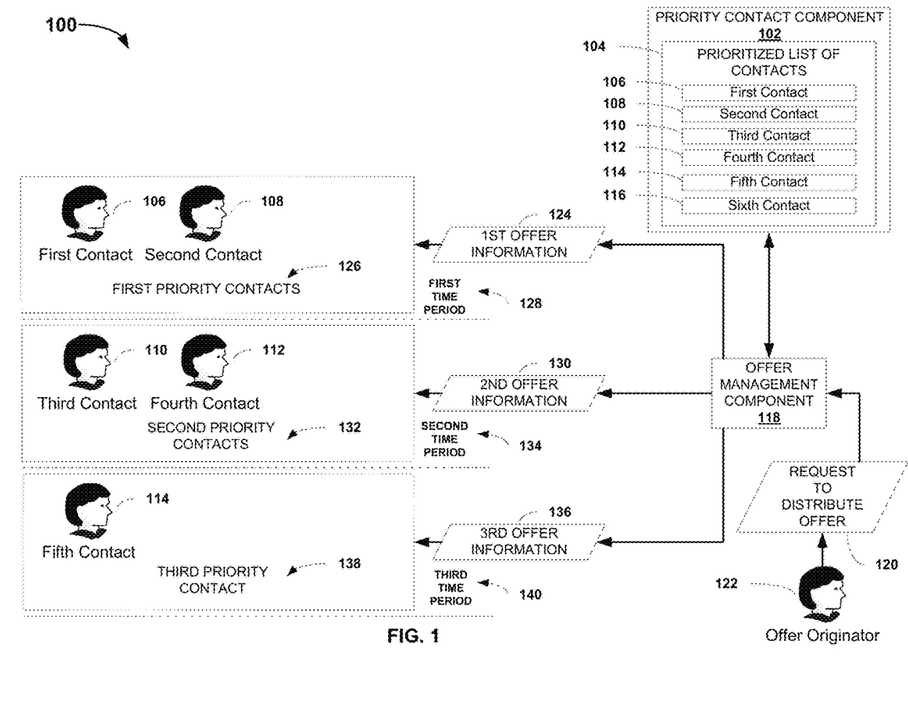
FIG. 1 is a block diagram of a first illustrative embodiment of system to automatically distribute offer information to priority contacts in a prioritized list of contacts.

Referring to FIG. 1, a block diagram of a first particular embodiment of system 100 to automatically distribute offer information to priority contacts in a prioritized list of contacts is illustrated. The system 100 includes a priority contact component 102 configured to store a prioritized list of contacts 104. In the embodiment illustrated in FIG. 1, the prioritized list of contacts 104 includes a first contact 106, a second contact 108, a third contact 110, a fourth contact 112, a fifth contact 114, and a sixth contact 116. Alternatively, the prioritized list of contacts 104 may include any number of contacts. The system 100 also includes an offer management component 118 in communication with the priority contact component 102. The system 100 of FIG. 1 provides automatic distribution of offer information to multiple contacts in a prioritized order, with first priority contacts 126 receiving offer information before other priority contacts. When the first priority contacts 126 do not respond within a predetermined time period, offer information is distributed to other priority contacts in the prioritized list of contacts 104.

The offer management component 118 is configured to receive a request 120 to distribute an offer (e.g., from an offer originator 122). In response to receiving the request 120, the offer management component 118 is configured to automatically distribute first offer information 124 to one or more of the first priority contacts 126 in the prioritized list of contacts 104. In the embodiment illustrated in FIG. 1, the first priority contacts 126 include the first contact 106 and the second contact 108. Alternatively, the first priority contacts 126 may include any number of contacts in the prioritized list of contacts 104. Offer information (e.g., the first offer information 124) may be distributed as an email message, a Hypertext Markup Language (HTML) message, an Instant Messaging (IM) message, a social networking website message, or a text message (e.g., a Short Messaging Service (SMS) message), among other alternatives. A contact may respond to the offer in the same message format or may respond to the offer in a different message format. For example, the offer originator 122 may request that the offer management component 118 distribute the first offer information 124 to the first contact 106 via an email message. The first contact 106 may respond via a reply email message or may respond in a different message format (e.g., via a text message). As another example, the offer originator 122 may request that the offer management component 118 distribute the first offer information 124 to the second contact 108 via a different message format (e.g., via an IM message). In this case, the second contact 108 may respond via a reply IM message or may respond in a different message format (e.g., via an HTML message). Thus, the offer management component 118 may distribute offer information and receive responses in multiple message formats.

When a first time period 128 expires without receiving a response to the offer from one or more of the first priority contacts 126, the offer management component 118 is configured to automatically distribute second offer information 130 to one or more second priority contacts 132 in the prioritized list of contacts 104. In the embodiment illustrated in FIG. 1, the second priority contacts 132 include the third contact 110 and the fourth contact 112. Alternatively, the second priority contacts 132 may include any number of contacts in the prioritized list of contacts 104. To illustrate, in one embodiment, the first priority contacts 126 include all of the contacts in the prioritized list of contacts 104, and the second priority contacts 132 include a subset of the contacts selected from the prioritized list of contacts 104. The second offer information 130 distributed to the second priority contacts 132 may be associated with the same goods or services that are offered to the first priority contacts 126. For example, an item offered for sale to the first priority contacts 126 may be the same item offered for sale to the second priority contacts 132.

In operation, the offer originator 122 submits the request 120 to distribute the offer to the offer management component 118. For example, the offer may include a request to receive one or more goods, one or more services, or any combination thereof. As an example, the offer originator 122 may submit a babysitter request, a contractor request, a request for a running partner, or a request for a golf partner, among other alternatives.

As another example, the offer may include an offer to provide (e.g., sell or give away) one or more goods, one or more services, or any combination thereof. For example, the offer originator 122 may offer to sell or give away tickets (e.g., tickets to a sporting event). As another example, the offer originator 122 may be a contractor or laborer offering to provide one or more services.

In response to receiving the request 120, the offer management component 118 retrieves priority contact information from the prioritized list of contacts 104 stored at the priority contact component 102. The prioritized list of contacts 104 includes one or more of the first priority contacts 126 designated to receive offer information before other contacts in the prioritized list of contacts 104. For example, in the embodiment illustrated in FIG. 1, the first contact 106 and the second contact 108 are designated as the first priority contacts 126 and receive offer information before the third contact 110, the fourth contact 112, the fifth contact 114, and the sixth contact 116. The prioritized list of contacts 104 also includes one or more of the second priority contacts 132 designated to receive offer information after the first priority contacts 126 but before other contacts in the prioritized list of contacts 104. For example, in the embodiment illustrated in FIG. 1, the third contact 110 and the fourth contact 112 are designated as the second priority contacts 132 and receive offer information after the first contact 106 and the second contact 108 but before the fifth contact 114 and the sixth contact 116.

The prioritized list of contacts 104 may also include one or more lower priority contacts designated to receive offer information after the first priority contacts 126 and the second priority contacts 132 but before other contacts in the prioritized list of contacts 104. For example, the prioritized list of contacts 104 may include one or more third priority contacts, one or more fourth priority contacts, or any number of contacts associated with lower priority levels. In the embodiment illustrated in FIG. 1, the fifth contact 114 is designated as a third priority contact 138 and receives offer information before the sixth contact 116 (e.g., a fourth priority contact).

Based on the priority contact information retrieved from the priority contact component 102, the offer management component 118 automatically distributes the first offer information 124 to the first contact 106 and to the second contact 108 (e.g., the first priority contacts 126). The offer management component 118 determines whether a response to the offer is received within the first time period 128. The first contact 106, the second contact 108, or both, may respond to the offer within the first time period 128. In this case, the offer originator 122 may be notified of the response, and the offer management component 118 may not distribute further offer information.

Thus, the first priority contacts 126 are provided with a predetermined amount of time to respond to the offer. Otherwise, the offer is made available to other contacts. As an example, the first time period 128 may include a week, a day, an hour, or any other time period. In one embodiment, the first time period 128 is the same for each type of offer. For example, an offer to give away sports tickets and an offer to provide babysitter services may be made available to the first priority contacts 126 for the same length of time (e.g., an hour). Alternatively, the first time period 128 may depend on the type of offer. For example, the offer to give away sports tickets and the offer to provide babysitter services may be made available to the first priority contacts 126 for different lengths of time (e.g., a day for the sports tickets and an hour for the babysitter service).

When the first time period 128 expires without receiving a response to the offer from any of the first priority contacts 126, the offer management component 118 automatically distributes the second offer information 130 to the third contact 110 and the fourth contact 112 (e.g., the second priority contacts 132). The offer management component 118 determines whether a response to the offer is received within a second time period 134. The third contact 110, the fourth contact 112, or both, may respond to the offer within the second time period 134. In this case, the offer originator 122 may be notified of the response, and the offer management component 118 may not distribute further offer information.

In a particular embodiment, the first offer information 124 distributed to the first priority contacts 126 and the second offer information 130 distributed to the second priority contacts 132 include the same offer information (e.g., price). In another particular embodiment, the first offer information 124 is different from the second offer information 130 (e.g., different prices).

In one embodiment, after the first time period 128 expires, the offer is no longer available to the first priority contacts 126. In another embodiment, after the first time period 128 expires, the offer is available to both the first priority contacts 126 and the second priority contacts 132. In this embodiment, the first contact 106, the second contact 108, the third contact 110, the fourth contact 112, or any combination thereof may respond to the offer within the second time period 134. In the event that any of these contacts respond within the second time period 134, the offer originator 122 may be notified of the response, and the offer management component 118 may not distribute further offer information.

In the particular embodiment illustrated in FIG. 1, when the second time period 134 expires without receiving a response to the offer, the offer management component 118 automatically distributes third offer information 136 to the fifth contact 114 (e.g., the third priority contact 138). The offer management component 118 determines whether a response to the offer is received within a third time period 140. If a response is received, the offer originator 122 may be notified of the response, and the offer management component 118 may not distribute further offer information. If the third time period 140 expires without receiving a response to the offer, the offer management component 118 may automatically distribute offer information to lower priority contacts. For example, the lower priority contacts may include the sixth contact 116. Alternatively, offer information may not be distributed to lower priority contacts (e.g., the sixth contact 116). In one embodiment, whether further offer information is distributed depends on the type of offer. For example, when the offer includes a sales offer, fourth offer information may be distributed to the sixth contact 116. As another example, when the offer includes a request for babysitter services, the sixth contact 116 may not receive fourth offer information.

In one embodiment, the first time period 128, the second time period 134, and the third time period 140 are the same. For example, the first time period 128, the second time period 134, and the third time period 140 may all be a week, a day, an hour, or any other length of time. In another embodiment, the first time period 128, the second time period 134, and the third time period 140 may not all be the same length of time. For example, the first time period 128 may be two hours, the second time period 134 may be one hour, and the third time period 140 may be thirty minutes. Similarly, two time periods may be the same, while another time period may be different. For example, the first priority contacts 126 and the second priority contacts 132 may each be given one hour to respond to the offer (e.g., the first time period 128 and the second time period 134 are both one hour), while the third priority contacts 138 may be given more time or less time to respond (e.g., thirty minutes or two hours).

Figure 2:
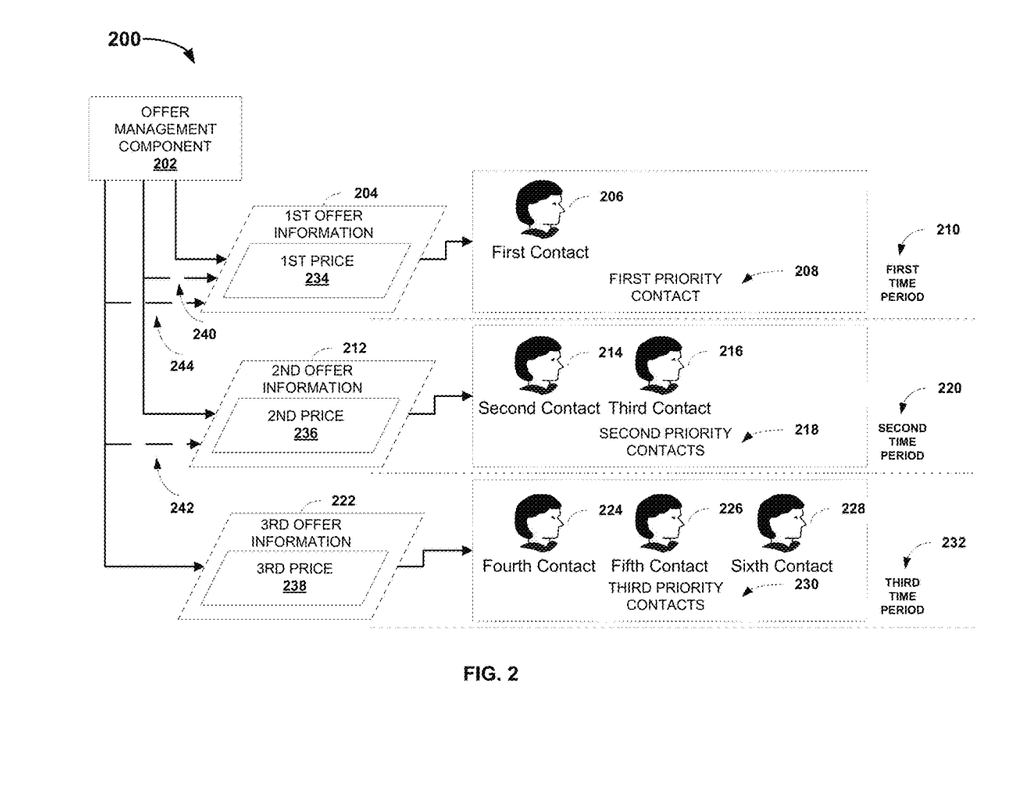
FIG. 2 is a block diagram of a second illustrative embodiment of system to automatically distribute offer information to priority contacts in a prioritized list of contacts.

Referring to FIG. 2, a block diagram of a second particular embodiment of a system 200 to automatically distribute offer information to priority contacts in a prioritized list of contacts is illustrated. In FIG. 2, an offer management component 202 distributes different offer information to different contacts. In one embodiment, the offer management component 202 of FIG. 2 is the offer management component 118 of FIG. 1.

In FIG. 2, the offer management component 202 automatically distributes first offer information 204 to a first contact 206 (e.g., a first priority contact 208). When a first time period 210 expires without receiving a response to the offer, the offer management component 202 automatically distributes second offer information 212 to a second contact 214 and a third contact 216 (e.g., second priority contacts 218). In the embodiment illustrated, when a second time period 220 expires without receiving a response to the offer, the offer management component 202 automatically distributes third offer information 222 to a fourth contact 224, to a fifth contact 226, and to a sixth contact 228 (e.g., third priority contacts 230). The first offer information 204 includes a first price 234, the second offer information 212 includes a second price 236, and the third offer information 222 includes a third price 238. The system 200 of FIG. 2 provides automatic distribution of different offer information to multiple contacts in a prioritized order, with a first priority contact 208 receiving the first offer information 204 before other offer information is distributed to other priority contacts. When the first priority contact 208 does not respond within a predetermined time period, different offer information is distributed to other priority contacts in a prioritized list of contacts.

In one embodiment, the second price 236 is less than the first price 234, and the third price 238 is less than the second price 236. For example, the offer may be a sales offer, and the first price 234 may be a first price that an offer originator (e.g., the offer originator 122 of FIG. 1) is willing to accept. The second price 236 may be a second price that the offer originator is willing to accept, and the third price 238 may be a third price that the offer originator is willing to accept. For example, if the offer originator is attempting to sell tickets to a sporting event, the offer originator may be more willing to reduce the sales price in order to increase the likelihood of sale before the sporting event. Similarly, as the time of the sporting event approaches, the offer originator may be more inclined to provide the tickets to closer friends at a reduced price to ensure that the tickets do not go to waste. Alternatively, the second price 236 may be greater than the first price 234, and the third price 238 may be greater than the second price 236. This may be a case where the offer originator is willing to take the risk that people will be willing to pay more for the tickets as the time of the sporting event approaches.

As another example, the offer may be a request to receive a service, and the first price 234 may be a first price that the offer originator is willing to pay for the service. The second price 236 may be a second price that the offer originator is willing to pay for the service, and the third price 238 may be a third price that the offer originator is willing to pay for the service. For example, in the case of a babysitter service, the priority contacts may be ranked in order of preference by the offer originator.

As an example, the first offer information 204 may be distributed to a first potential babysitter (e.g., the first priority contact 208). In this example, the first priority contact (e.g., the first contact 206) represents the most preferred babysitter of the offer originator. The first price 234 that the offer originator is willing to pay may be a premium price (e.g., twenty dollars per hour). When the first time period 210 expires without a response to the offer, the second offer information 212 is distributed to a second set of potential babysitters (e.g., the second priority contacts 218). In this example, the second priority contacts 218 (e.g., the second contact 214 and the third contact 216) represent babysitters that are less preferred by the offer originator than the first priority contact 208. As such, the second price 236 that the offer originator is willing to pay may be a reduced price (e.g., fifteen dollars per hour). In the embodiment illustrated, when the second time period 230 expires without a response, the third offer information 232 is distributed to a third set of potential babysitters (e.g., the third priority contacts 230). In this example, the third priority contacts 230 (e.g., the fourth contact 224, the fifth contact 226, and the sixth contact 228) represent babysitters that are less preferred by the offer originator than the second priority contacts 218. As such, the third price 238 that the offer originator is willing to pay may be a further reduced price (e.g., ten dollars per hour).

In another embodiment, the second price 236 is greater than the first price 234, and the third price 238 is greater than the second price 236. For example, in the case of a babysitter service, the longer it takes to secure a babysitter, the more risk that the offer originator may be forced to cancel or alter plans. To illustrate, if the offer originator has plans in the evening, the price that the offer originator is willing to pay for the babysitter service may increase as the day goes on. Further, more potential babysitters may be acceptable to the offer originator depending on the time remaining before the service is required. For example, in the embodiment shown in FIG. 2, the number of potential babysitters increases as the time periods expire.

As an example, the offer originator may have plans at 8:00 PM, and the first offer information 204 may be distributed to a first set of potential babysitters (e.g., the first contact 206) at 8:00 AM. The first price 234 that the offer originator is willing to pay may be ten dollars per hour, and the first time period 210 may be four hours. When the first time period 210 expires at 12:00 PM, the urgency of locating a babysitter may increase. Thus, the offer originator may be willing to pay more for the babysitter service. The second offer information 212 distributed to a second set of potential babysitters (e.g., the second contact 214 and the third contact 216) may include a second price 236 that is higher than the first price 234. At this point in time, the second price 236 that the offer originator is willing to pay may be fifteen dollars per hour. Further, because only eight hours remain before the babysitter is needed, the second time period 230 may be shortened to two hours. When the second time period 230 expires at 2:00 PM, the offer originator may be willing to pay even more for the babysitter service. The third offer information 232 distributed to a third set of potential babysitters (e.g., the third contact 234, the fourth contact 236, and the fifth contact 238) may include a third price 238 that is higher than both the first price 234 and the second price 236. At this point in time, the third price 238 that the offer originator is willing to pay may be twenty dollars per hour. Further, because only six hours remain before the babysitter is needed, the third time period 232 may be shortened to one hour. While not shown in FIG. 2, further offer information may be provided to other contacts when the third time period 232 expires. For example, when the third time period 232 expires, an open offer may be presented to any combination of contacts in the prioritized list of contacts. To illustrate, the open offer may invite the contacts to respond to the request with an amount that the contact is willing to accept in order to provide the babysitter service.

In the embodiment illustrated in FIG. 2, when the first time period 210 expires without a response to the offer from the first priority contact 208, the second offer information 212 may be distributed to the second priority contacts 218 as well as to the first priority contact 208, as illustrated at 240. In this case, the first contact 206, the second contact 214, and the third contact 216 are presented the second offer information 212 and given the opportunity to respond to the offer until the second time period 220 expires. In another embodiment, when the first time period 210 expires without a response to the offer from the first priority contact 208, the second offer information 212 may be distributed to only the second priority contacts 218. In this case, only the second contact 214 and the third contact 216 are presented the second offer information 212 and given the opportunity to respond to the offer until the second time period 220 expires.

Similarly, in one embodiment, when the second time period 220 expires without a response to the offer, the third offer information 232 may be distributed to the third priority contacts 230 along with other priority contacts. For example, the third offer information 232 may be distributed to the third priority contacts 230 and to the second priority contacts 218, as illustrated at 242. As another example, the third offer information 232 may be distributed to the third priority contacts 230 and to the first priority contact 208, as illustrated at 244. As a further example, the third offer information 232 may be distributed to the third priority contacts 230 and to both the first priority contact 208 and the second priority contacts 218. In this case, the fourth contact 234, the fifth contact 236, the sixth contact 238, and any combination of the other priority contacts are presented the third offer information 222 and given the opportunity to respond to the offer until the third time period 232 expires. In another embodiment, when the second time period 220 expires without a response to the offer, the third offer information 232 may be distributed to only the third priority contacts 230. In this case, only the fourth contact 234, the fifth contact 236, and the sixth contact 238 are presented the third offer information 222 and given the opportunity to respond to the offer until the third time period 232 expires.

Figure 3:
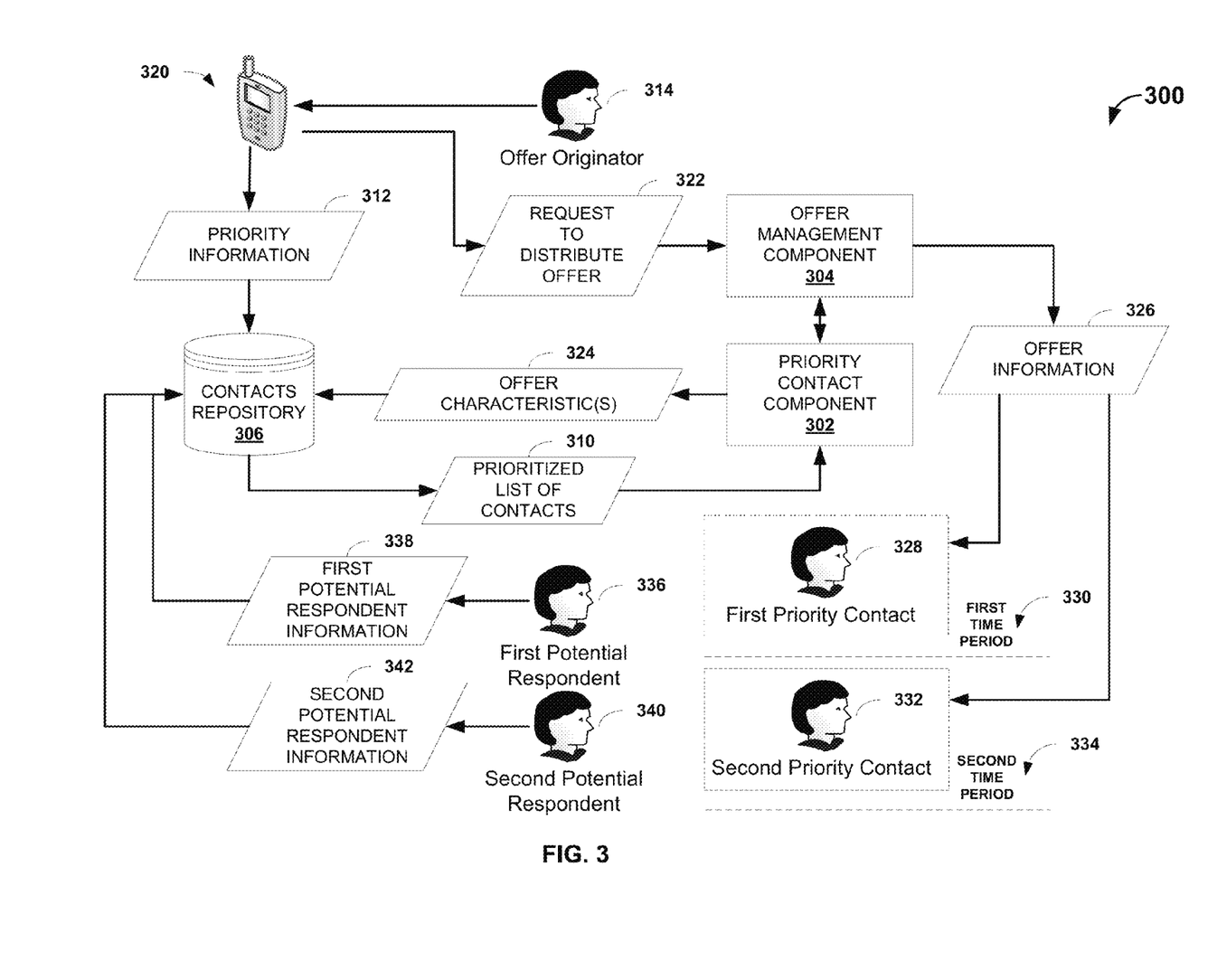
FIG. 3 is a block diagram of a third illustrative embodiment of system to automatically distribute offer information to priority contacts in a prioritized list of contacts.

Referring to FIG. 3, a block diagram of a third illustrative embodiment of a system 300 to automatically distribute offer information is illustrated. The system 300 includes a priority contact component 302, an offer management component 304, and a contacts repository 306. In one embodiment, a prioritized list of contacts 310 is automatically determined by matching priority information 312 provided by an offer originator 314 to information stored at the contacts repository 306. In another embodiment, the prioritized list of contacts 310 is automatically determined based on at least one or more offer characteristics 324 and information stored at the contacts repository 306. In the embodiment illustrated in FIG. 3, the prioritized list of contacts 310 may be further determined based on information stored at the contacts repository 306 that is provided by one or more potential respondents to the offer. The system 300 of FIG. 3 provides automatic distribution of offer information 326 to multiple priority contacts, where the order of distribution is determined automatically based on information stored at the contacts repository 306.

In FIG. 3, the contacts repository 306 is configured to receive the priority information 312 from the offer originator 314. In one embodiment, the offer originator 314 provides the priority information 312 via a web-based user interface. For example, the offer originator 314 may provide the priority information 312 via a communications device 320. In a particular embodiment, the communications device 320 includes a cellular telephone. Alternatively, the communications device 320 may include a desktop computer, a laptop computer, a personal digital assistant, or a set-top box device, among other alternatives.

The priority contact component 302, the offer management component 304, and the contacts repository 306 may be associated with one or more computer systems. For example, in FIG. 3, the priority contact component 302, the offer management component 304, the contacts repository 306, or any combination thereof may be stored at the communications device 320. Alternatively, the priority contact component 302, the offer management component 304, the contacts repository 306, or any combination thereof may be stored at a computer system other than the communications device 320. For example, the offer originator 314 may access a service via a web-based user interface displayed at the communications device 320. In this case, the offer originator 314 may provide a request 322 to distribute the offer to a remote offer management component 304 via the web-based user interface. Further, the offer originator 314 may provide the priority information 312 to a remote contacts repository 306 via the web-based user interface.

In operation, the offer management component 304 receives the request 322 to distribute an offer from the offer originator 314. The offer includes one or more offer characteristics 324. In response to receiving the request 322, the offer management component 304 requests the prioritized list of contacts 310 from the priority contact component 302. The prioritized list of contacts 310 may be automatically determined based on information stored at the contacts repository 306. The offer management component 304 automatically distributes the offer information 326 to one or more contacts included in the prioritized list of contacts 310. In the embodiment illustrated in FIG. 3, the offer information 326 is distributed to a first priority contact 328 during a first time period 330; and when the first time period 330 expires, the offer information 326 is distributed to a second priority contact 332. When a second time period 334 expires, the offer information 326 may be distributed to at least one lower priority contact (not shown). In alternative embodiments, the offer information 326 may be distributed to any number of priority contacts during the first time period 330 or during the second time period 334. Further, as explained above, the offer information 326 distributed to the first priority contact 328 may be different from the offer information 326 distributed to the second priority contact 332.

In one embodiment, the contacts repository 306 stores information associated with a plurality of contacts provided by the offer originator 314 (e.g., a contact list of the offer originator 314). For example, the contacts repository 306 may store email addresses, phone numbers, IM screen names, or any other contact information for each contact. In a particular embodiment, the priority information 312 provided by the offer originator 314 is used to automatically prioritize the contacts in the contact list of the offer originator 314. Thus, the system 300 of FIG. 3 may provide automatic distribution the offer information 326 to contacts that are known to the offer originator 314.

In the embodiment illustrated in FIG. 3, the contacts repository 306 is configured to receive potential respondent information from one or more potential respondents to the offer. The prioritized list of contacts 310 may be automatically determined by matching the priority information 312 to one or more potential respondents that may not be known to the offer originator 314 (e.g., not in the contact list of the offer originator 314). Alternatively, the prioritized list of contacts 310 may also include one or more known contacts (e.g., contacts in the contact list of the offer originator 314). The prioritized list of contacts 310 may also be automatically determined based on at least one of the one or more offer characteristics 324. For example, the one or more offer characteristics 324 may include information that may be used to determine a type of offer, a location of the offer originator 314, or a time of day, among other alternatives. To illustrate, if the one or more offer characteristics 324 indicate that the offer is a request for a running partner, a location of the offer originator 314 may be used to automatically prioritize contacts. For example, the prioritized list of contacts 310 may include a first set of priority contacts (e.g., the first priority contact 328) within a first distance of the offer originator 314 and a second set of priority contacts (e.g., the second priority contact 332) within a second distance of the offer originator 314. It should be noted that the priority information 312 provided by the offer originator 314 may be used along with the one or more offer characteristics to determine the prioritized list of contacts 310. Thus, the system 300 of FIG. 3 may provide automatic distribution of the offer information 326 to contacts that may or may not be known to the offer originator 314.

In the embodiment illustrated in FIG. 3, a first potential respondent 336 provides first potential respondent information 338, and a second potential respondent 340 provides second potential respondent information 342. The first potential respondent information 338 and the second potential respondent information 342 may include information such as services offered, price, location, or experience, among other alternatives. Alternatively, any number of potential respondents may provide potential respondent information.

The priority information 312 provided by the offer originator 314 may include one or more contact selection preferences. For example, the offer may be a request for a babysitter service, and the contact selection preferences may include price, location, experience, or a customer feedback rating, among other alternatives. As an illustrative example, the priority information 312 may indicate that a location of a potential respondent is the highest priority factor in selecting one or more first priority contacts, that a price that the potential respondent charges is the next highest priority factor, and that the experience level of the potential respondent is the next highest priority factor. In this case, the first potential respondent information 338 may include a location, a price, and an experience level associated with the first potential respondent 336, and the second potential respondent information 342 may include a location, a price, and an experience level associated with the second potential respondent 340.

As an illustrative example, a Global Positioning System (GPS) location of the offer originator 314 may be one of the one or more offer characteristics 324. For example, the communications device 320 may be a cellular telephone with GPS capabilities. The priority contact component 302 may query the contacts repository 306 using the GPS location of the offer originator 314. The contacts repository 306 may store GPS location information associated with a plurality of contacts, and the prioritized list of contacts 310 may be determined based on a comparison of GPS locations. For example, the GPS location information stored at the contacts repository 306 may indicate that the first potential respondent 336 is located one mile from the offer originator 314. The first potential respondent 336 may charge fifteen dollars per hour and may have one year of babysitter experience. The second potential respondent 340 may be located ten miles from the offer originator 314, may charge ten dollars per hour, and may have five years of babysitter experience. In this example, the first potential respondent 336 may be ranked as the first priority contact 328 in the prioritized list of contacts 310 based on the location (e.g., the highest priority factor in the priority information 312 provided by the offer originator 314). The second potential respondent 340 may be ranked as the second priority contact 332 because the second potential respondent 340 is located ten miles from the offer originator 314 while the first potential respondent 336 is located only one mile from the offer originator 314. Thus, the prioritized list of contacts 310 may be determined based on a single factor (e.g., the highest priority factor of location). Alternatively, the prioritized list of contacts 310 may be determined based on multiple factors. For example, while the second potential respondent 340 is closer to the offer originator 314 than the first potential respondent 336, the second potential respondent 340 charges less than the first potential respondent 336 and has more experience than the first potential respondent 336. In this case, the second potential respondent 340 may be ranked as the first priority contact 328 in the prioritized list of contacts 310 based on a combination of factors (e.g., worse location but better price and more experience).

Figure 4:
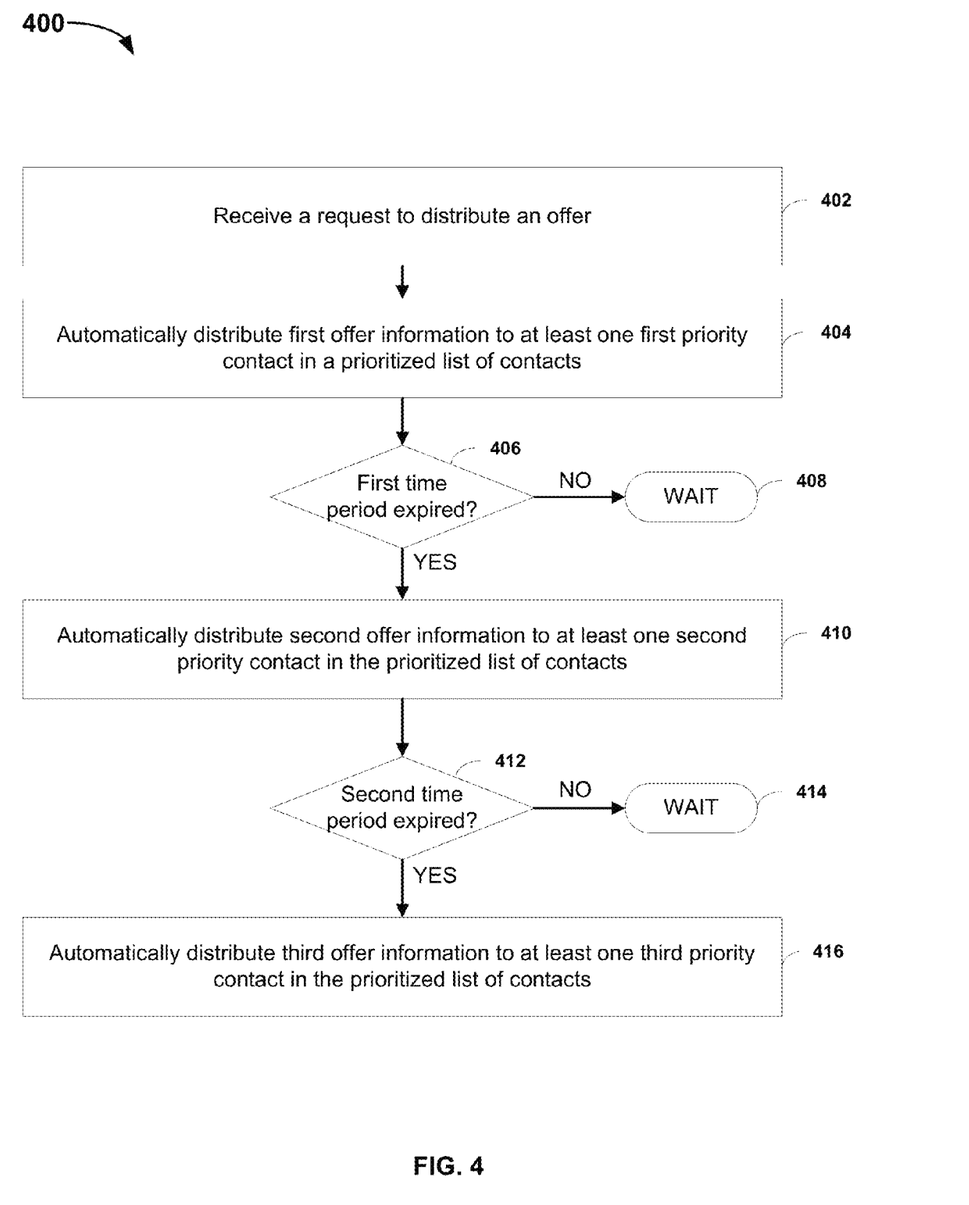
FIG. 4 is a flow chart of a first illustrative embodiment of a method of automatically distributing offer information to priority contacts in a prioritized list of contacts.

Referring to FIG. 4, a particular embodiment of a method of prioritized distribution of offer information is illustrated, at 400. The method includes receiving a request to distribute an offer, at 402. For example, an offer originator may send a request to distribute an offer to an offer management component (e.g., the offer originator 122 of FIG. 1 may send the request 120 to distribute the offer to the offer management component 118). In a particular embodiment, the offer may include a request to receive one or more goods, one or more services, or any combination thereof. In another particular embodiment, the offer may include an offer to provide (e.g., sell or give away) one or more goods, one or more services, or any combination thereof.

In response to receiving the request to distribute the offer, the method includes automatically distributing first offer information to at least one first priority contact in a prioritized list of contacts, at 404. For example, in FIG. 1, the offer management component 118 automatically distributes first offer information 124 to the first priority contacts 126 in the prioritized list of contacts 104.

The method includes determining whether a first time period has expired, at 406. When the first time period has not expired, the method includes waiting for a response to the offer, at 408. When the first time period has expired without receiving a response to the offer from at least one priority contact, the method includes automatically distributing second offer information to at least one second priority contact in the prioritized list of contacts, at 410. For example, in FIG. 1, when the first time period 128 expires without a response from either the first contact 106 or the second contact 108, the offer management component 118 automatically distributes the second offer information 130 to the second priority contacts 132 in the prioritized list of contacts 104.

In the embodiment illustrated in FIG. 4, the method also includes determining whether a second time period has expired, at 412. When the second time period has not expired, the method includes waiting for a response to the offer, at 414. In one embodiment, only the second priority contacts may respond during the second time period. In another embodiment, both the first priority contacts and the second priority contacts may respond during the second time period. When a response to the offer is received before the second time period expires, offer information is not distributed to other contacts. When the second time period has expired without a response, the method includes automatically distributing third offer information to at least one third priority contact in the prioritized list of contacts, at 416. For example, in FIG. 1, when the second time period 134 expires, the offer management component 118 automatically distributes the third offer information 136 to the third priority contact 138 in the prioritized list of contacts 104.

Figure 5:
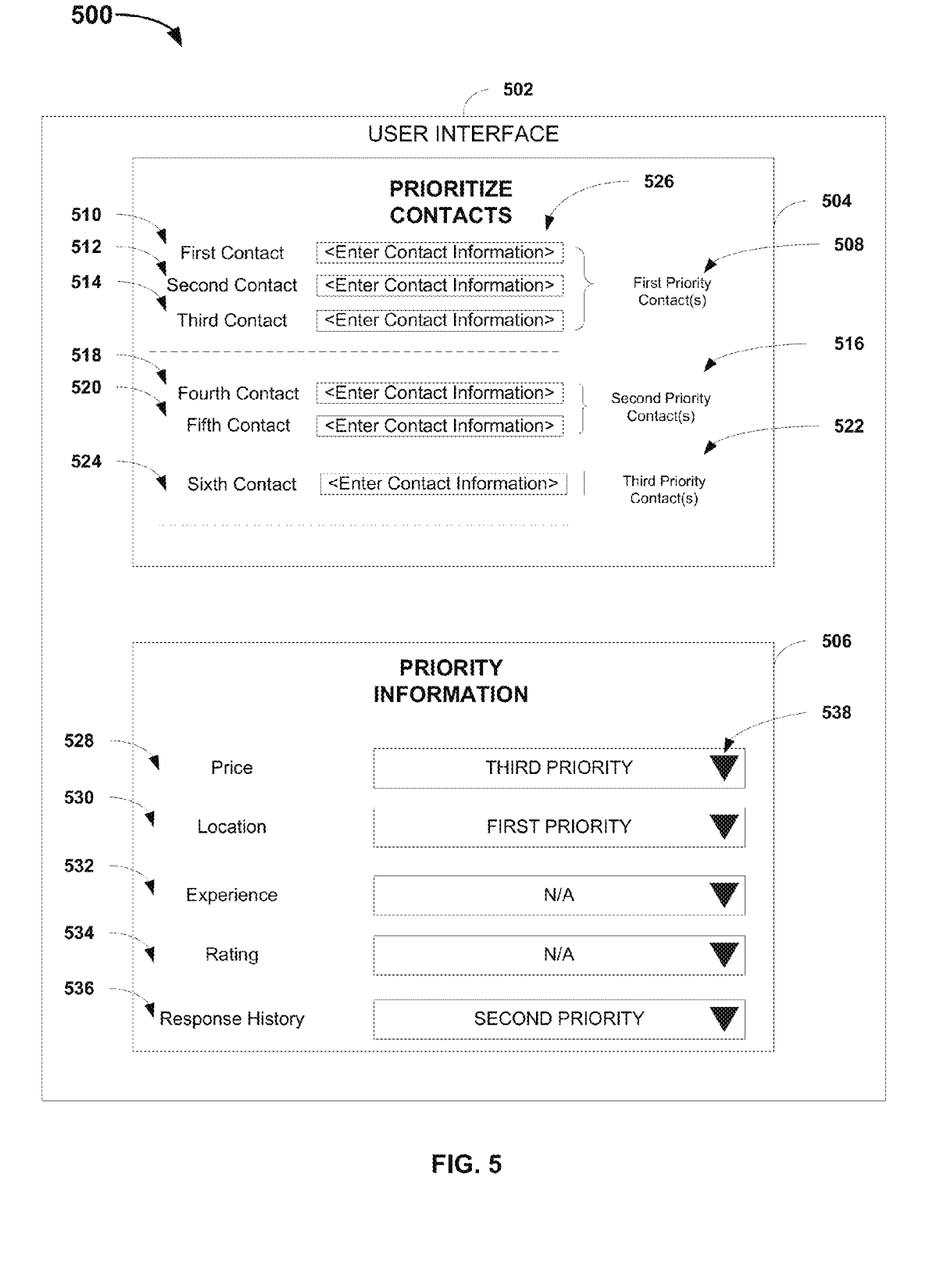
FIG. 5 depicts an illustrative embodiment of a user interface to receive prioritization information.

Referring to FIG. 5, an illustrative embodiment of a user interface 502 to receive user-defined prioritization information is illustrated, at 500. In one embodiment, the user interface 502 is a web-based user interface. The user interface 502 may include a first area 504 that allows an offer originator to prioritize contacts (e.g., contacts in a contact list of the offer originator). For example, the offer originator 122 of FIG. 1 may provide the prioritized list of contacts 104 to the priority contact component 102. The user interface 502 may also include a second area 506 that allows an offer originator to provide priority information that is used to automatically determine a prioritized list of contacts (e.g., without the offer originator prioritizing contacts). For example, the user interface 502 of FIG. 5 may be displayed at the communications device 320 of FIG. 3, allowing the offer originator 314 to provide the priority information 312 to the contacts repository 306. The offer originator 314 may also provide updated priority contact information via the user interface 502. The updated priority contact information may be transmitted to the contacts repository 306 to update priority information previously stored at the contacts repository 306. As explained above with respect to FIG. 3, the prioritized list of contacts 310 may be automatically determined based on at least the priority information 312 received from the offer originator 314.

In the embodiment illustrated in FIG. 5, the offer originator may input information identifying one or more first priority contacts 508 to receive automatic distribution of offer information. In FIG. 5, the first priority contacts 508 include a first contact 510, a second contact 512, and a third contact 514. The offer originator may also input information identifying one or more second priority contacts 516. In FIG. 5, the second priority contacts 516 include a fourth contact 518 and a fifth contact 520. The offer originator may also input information identifying one or more third priority contacts 522. In FIG. 5, the third priority contacts 522 include a single contact (e.g., a sixth contact 524). The first priority contacts 508 receive offer information from the offer originator before the second priority contacts 516, and the second priority contacts 516 receive offer information before the third priority contacts 522. Thus, a user-defined prioritized list of contacts may be provided via the user interface 502.

The first priority contacts 508 represent the highest priority contacts, while the second priority contacts 516 and third priority contacts 522 represent lower priority contacts. For example, first offer information is automatically distributed to the highest priority contacts (e.g., the first contact 510, the second contact 512, and the third contact 514) in response to receiving a request from the offer originator to distribute an offer. If none of the highest priority contacts respond before a first time period expires, second offer information is automatically distributed to the next highest priority contacts (e.g., the second priority contacts 516). Similarly, if a response to the offer is not received before a second time period expires, third offer information may be automatically distributed to the next highest priority contacts (e.g., the third priority contacts 522). While three sets of priority contacts are illustrated in FIG. 5, any number of contacts may be prioritized via the user interface 502.

The offer originator may input contact information associated with each priority contact via a plurality of text input boxes 526. For example, the contact information may include a wired telephone number, a wireless telephone number (e.g., a cellular telephone number), an email address, an instant messaging (IM) address, or a facsimile (fax) address, among other alternatives.

The second area 506 of the user interface 502 may allow an offer originator to provide priority information to enable automatic prioritization of a plurality of contacts. A prioritized list of contacts may be automatically determined by matching the priority information provided via the user interface 502 to information stored at a contacts repository. For example, the offer originator 314 of FIG. 3 may provide the priority information 312 to the contacts repository 306.

The second area 506 may include a plurality of factors (e.g., one or more common factors) that the offer originator may rank in order of priority. In the embodiment illustrated in FIG. 5, the factors include a price factor 528, a location factor 530, an experience factor 532, a rating factor 534, and a response history factor 536. In alternative embodiments, other predetermined factors may be displayed in the second area 506. Each predetermined factor may be ranked using a selectable menu. For example, a selectable arrow 538 may be used to select a priority rank of a particular predetermined factor. The default priority rank may be "N/A" with the selectable arrow 538 enabling the offer originator to adjust the ranking. For example, as shown in FIG. 5, the location factor 530 may be ranked as the first priority factor, the response history factor 536 may be ranked as the second priority factor, and the price factor 528 may be ranked as the third priority factor. In addition, the experience factor 532 and the rating factor 534 may not be ranked as priority factors.

As an illustrative example, the offer originator may learn that she needs a babysitter within the next few hours. In this case, the most important factor may be the location of a potential babysitter. Further, the response history may be considered the next most important factor. The response history may represent a likelihood that a particular contact will respond to the offer based on past history. For example, the particular contact may not be likely to respond to the offer or may not be likely to respond within a particular time period. In this case, the particular contact may not be ranked as high as a high priority contact given the likelihood that she will not respond in time for the offer originator to ensure that a babysitter has been secured. The price may be considered the next most important factor. If multiple potential babysitters are located within the same area (e.g., the first priority factor) and have similar response histories (e.g., the second priority factor), price may then be considered in determining a ranking in the prioritized list of contacts. Alternatively, any combination of prioritized factors may be used to automatically determine the prioritized list of contacts.

Figure 6:
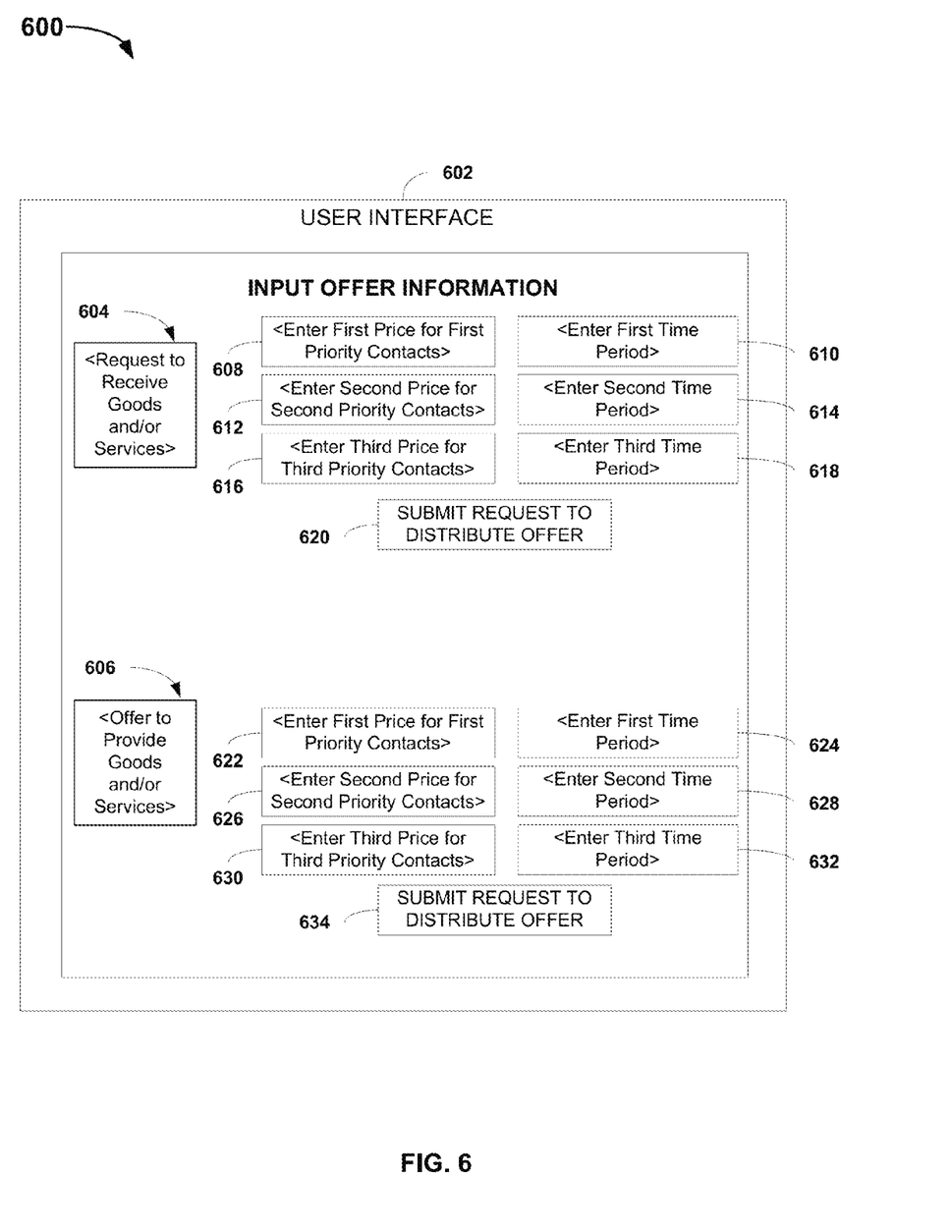
FIG. 6 depicts an illustrative embodiment of a user interface to receive a request to distribute an offer.

Referring to FIG. 6, an illustrative embodiment of a user interface 602 to receive a request to distribute an offer is illustrated, at 600. In one embodiment, the user interface 602 is a web-based user interface. The user interface 602 may allow an offer originator to provide information associated with a request to receive goods or services or to provide information associated with an offer to provide goods or services. The offer originator may manually enter an offer via a request to receive goods or services text input box 604. Similarly, the offer originator may manually enter an offer via an offer to provide goods or services text input box 606. Alternatively, the offer originator may select a predefined offer from a list of offers (e.g., common offers). For example, a plurality of selectable requests to receive goods or services may be displayed, or a plurality of selectable offers to provide goods or services may be displayed. The selectable offers may include a request for a babysitter service, a request for a running partner, or an offer to sell tickets to a sporting event, among other alternatives.

With regard to the request to receive goods or services, the user interface 602 includes a first priority price input box 608 for an offer originator to define a first price for first priority contacts and an associated first priority time period input box 610 for the offer originator to define a first time period for the first priority contacts to respond to an offer. The first price may be included in first offer information that is distributed to one or more first priority contacts. As an illustrative example, in the case of a babysitter service, the offer originator may input a first price of ten dollars per hour into the first priority price input box 608 and may input a first time period of four hours into the first priority time period input box 610. The first time period defines a timeout period for the first priority contacts to respond to the offer. For example, in FIG. 2, the first offer information 204 that is automatically distributed to the first priority contact 208 (e.g., the first contact 206) includes the first price 234 (e.g., ten dollars per hour).

The user interface 602 also includes a second priority price input box 612 for the offer originator to define a second price for second priority contacts and an associated second priority time period input box 614 for the offer originator to define a second time period for response. The second price is included in second offer information that is distributed to one or more second priority contacts. For example, the offer originator may input a second price of fifteen dollars per hour into the second priority price input box 612 and may input a second time period of two hours into the second priority time period input box 614. Referring to FIG. 2, if no response is received from the first contact 206 within the first time period 210 (e.g., four hours), the second offer information 212 is automatically distributed to the second priority contacts 218 (e.g., the second contact 214 and the third contact 216). The second offer information 212 includes the second price 236 (e.g., fifteen dollars per hour).

In the embodiment illustrated in FIG. 6, the user interface 602 includes a third priority price input box 616 for the offer originator to define a third price for third priority contacts and an associated third priority time period input box 618 for the offer originator to define a third time period for response. The third price is included in third offer information that is distributed to one or more third priority contacts. For example, the offer originator may input a third price of twenty dollars per hour into the third priority price input box 616 and may input a third time period of one hour into the third priority time period input box 618. Referring to FIG. 2, if no response to the offer is received within the second time period 220 (e.g., two hours), the third offer information 222 that is automatically distributed to the third priority contacts 230 (e.g., the fourth contact 224, the fifth contact 226, and the sixth contact 228) includes the third price 238 (e.g., twenty dollars per hour). When the third time period 232 (e.g., one hour) expires without a response, further offer information may be provided to other contacts. In the embodiment illustrated in FIG. 6, the offer originator may submit the request to distribute the offer by selecting a button 620.

With regard to the offer to provide goods or services, the user interface 602 includes a first priority price input box 622 for an offer originator to define a first price for first priority contacts and an associated first priority time period input box 624 for the offer originator to define a first time period for the first priority contacts to respond to an offer. The user interface 602 also includes a second priority price input box 626 for the offer originator to define a second price for second priority contacts and an associated second priority time period input box 628 for the offer originator to define a second time period for response. In the embodiment illustrated in FIG. 6, the user interface 602 includes a third priority price input box 630 for the offer originator to define a third price for third priority contacts and an associated third priority time period input box 632 for the offer originator to define a third time period for response. In the embodiment illustrated in FIG. 6, the offer originator may submit the request to distribute the offer by selecting a button 634.

Figure 7:
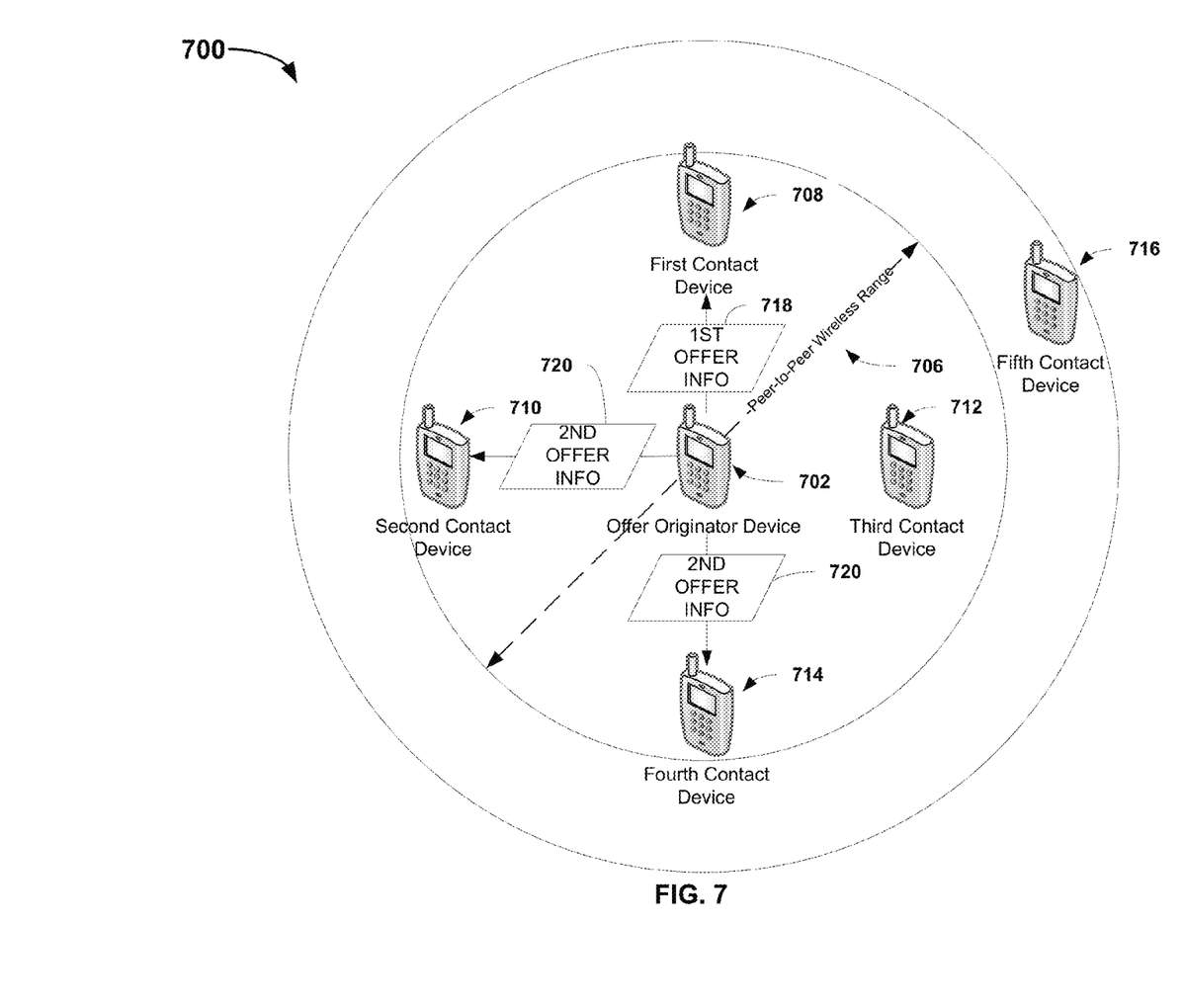
FIG. 7 is a general diagram of an illustrative embodiment of a system of automatic distribution of prioritized offer information via a peer-to-peer wireless connection.

Referring to FIG. 7, an illustrative embodiment of a system of automatic distribution of prioritized offer information via a peer-to-peer wireless connection is illustrated, at 700. An offer originator device 702 may automatically distribute offer information to one or more devices associated with priority contacts that are within a peer-to-peer wireless range 706 of the offer originator device 702. In the embodiment of FIG. 7, a first contact device 708, a second contact device 710, a third contact device 712, a fourth contact device 714, and a fifth contact device 716 are shown. In alternative embodiments, the offer originator device 702 may communicate with any number of devices associated with any number of priority contacts.

As shown in FIG. 7, the first contact device 708, the second contact device 710, the third contact device 712, and the fourth contact device 714 are within the peer-to-peer wireless range 706 of the offer originator device 702. By contrast, the fifth contact device 716 is outside of the peer-to-peer wireless range 706. The peer-to-peer wireless range 706 may depend on hardware associated with the offer originator device 702. For example, the offer originator device 702 may include a cellular telephone with Bluetooth wireless communication capabilities. In a particular embodiment, the offer originator device 702 includes a Class 1 Bluetooth transceiver (e.g., with a maximum permitted power of 100 mW or 20 dBm) that may provide a peer-to-peer wireless range 706 of approximately 100 meters. In another embodiment, the offer originator device 702 includes a Class 2 Bluetooth transceiver (e.g., with a maximum permitted power of 2.5 mW or 4 dBm) that may provide a peer-to-peer wireless range 706 of approximately 10 meters.

The offer originator device 702 distributes offer information to one or more first priority contacts within the peer-to-peer wireless range 706 via a peer-to-peer wireless connection (e.g., via a Bluetooth connection) in response to receiving a request to distribute an offer. For example, an offer originator may use a keypad of the offer originator device 702 to request that the offer be distributed. Alternatively, the offer originator may use a touchscreen, a mouse, a voice recognition application, or any other input method to request that the offer be distributed.

In operation, an offer originator (e.g., the offer originator 314 of FIG. 3) submits a request to distribute an offer. An offer management component communicates with a priority contact component to determine whether any of the devices within the peer-to-peer wireless range 706 are priority contacts. In a particular embodiment, the offer management component is stored at the offer originator device 702, and the priority contact component is stored at a remote location. For example, the offer originator device 702 may include the communications device 320 of FIG. 3; the offer management component may include the offer management component 304 of FIG. 3; and the remote priority contact component may include the priority contact component 302 of FIG. 3.

In response to the request to distribute the offer, the offer management component stored at the offer originator device 702 requests a prioritized contact list from the remote priority contact component. For example, the offer originator device 702 may transmit the request for the prioritized contact list to the remote priority contact component via a cellular telephone network.

The remote priority contact component may determine the prioritized list of contacts based on at least priority information from the offer originator. In one embodiment, the prioritized list of contacts is determined based on priority information received from an offer originator (e.g., via the user interface 502 of FIG. 5). For example, the priority contact component 302 of FIG. 3 may determine the prioritized list of contacts 310 based on at least the priority information 312 received from the offer originator 314 that is stored at the contacts repository 306. In another embodiment, the prioritized list of contacts is determined based on the priority information received from the offer originator and based on information received from one or more potential respondents. For example, the priority contact component 302 of FIG. 3 may determine the prioritized list of contacts 310 based on the priority information 312 received from the offer originator 314 that is stored at the contacts repository 306 and based on potential respondent information that is stored at the contacts repository 306. In the embodiment illustrated in FIG. 7, the remote priority contact component determines that the first contact device 708 is a first priority contact in a prioritized list of contacts and that the second contact device 710 and the fourth contact device 714 are second priority contacts in the prioritized list of contacts. The remote priority contact component transmits the prioritized list of contacts to the offer management component at the offer originator device 702.

As a result, first offer information 718 is communicated to the first contact device 708 via the offer management component stored at the offer originator device 702. If the first contact device 708 does not respond within a first time period, second offer information 720 is automatically distributed to the second contact device 710 and to the fourth contact device 714. If a response to the offer is not received within a second time period, third offer information may be automatically distributed to one or more third priority contacts (not shown).

As an illustrative example, an offer originator may be located at a sports venue hosting a sporting event. The offer originator may submit, via the offer originator device 702, a request to distribute an offer to sell tickets to the sporting event. In this location, multiple potential respondents to the offer may be located within the peer-to-peer wireless range 706 of the offer originator device 702. Priority information from the offer originator may indicate that a response history may be the highest priority factor due to an impending start time of the sporting event. For example, the offer originator may rank the response history as the highest priority factor using the user interface 502 of FIG. 5. The first contact device 708 may have the highest response history ranking, while the second contact device and the fourth contact device 714 may have a lower response history ranking. Thus, the first contact device 708 may be identified as a first priority contact, and the second contact device 710 and the fourth contact device 714 may be identified as second priority contacts. First offer information 718 is then communicated to the first contact device 708. For example, the first offer information 718 may include a price of fifty dollars per ticket. If the first contact device 708 does not respond within a first time period (e.g., ten minutes), second offer information 720 is automatically distributed to the second contact device 710 and to the fourth contact device 714. For example, the second offer information 720 may include a reduced price of forty dollars per ticket.

While not shown in FIG. 7, if a response is not received within a second time period (e.g., five minutes), third offer information may be distributed to one or more third priority contacts. For example, the third offer information may include a reduced price of thirty dollars per ticket. In this case, because no third priority contacts were identified within the peer-to-peer wireless range 706 of the offer originator device 702, the third offer information may be automatically re-distributed to the first contact device 708, the second contact device 710, the fourth contact device 714, or any combination thereof. Further, if a third time period (e.g., three minutes) expires without a response, any number of additional automatic distributions of offer information may be performed.

Figure 8:
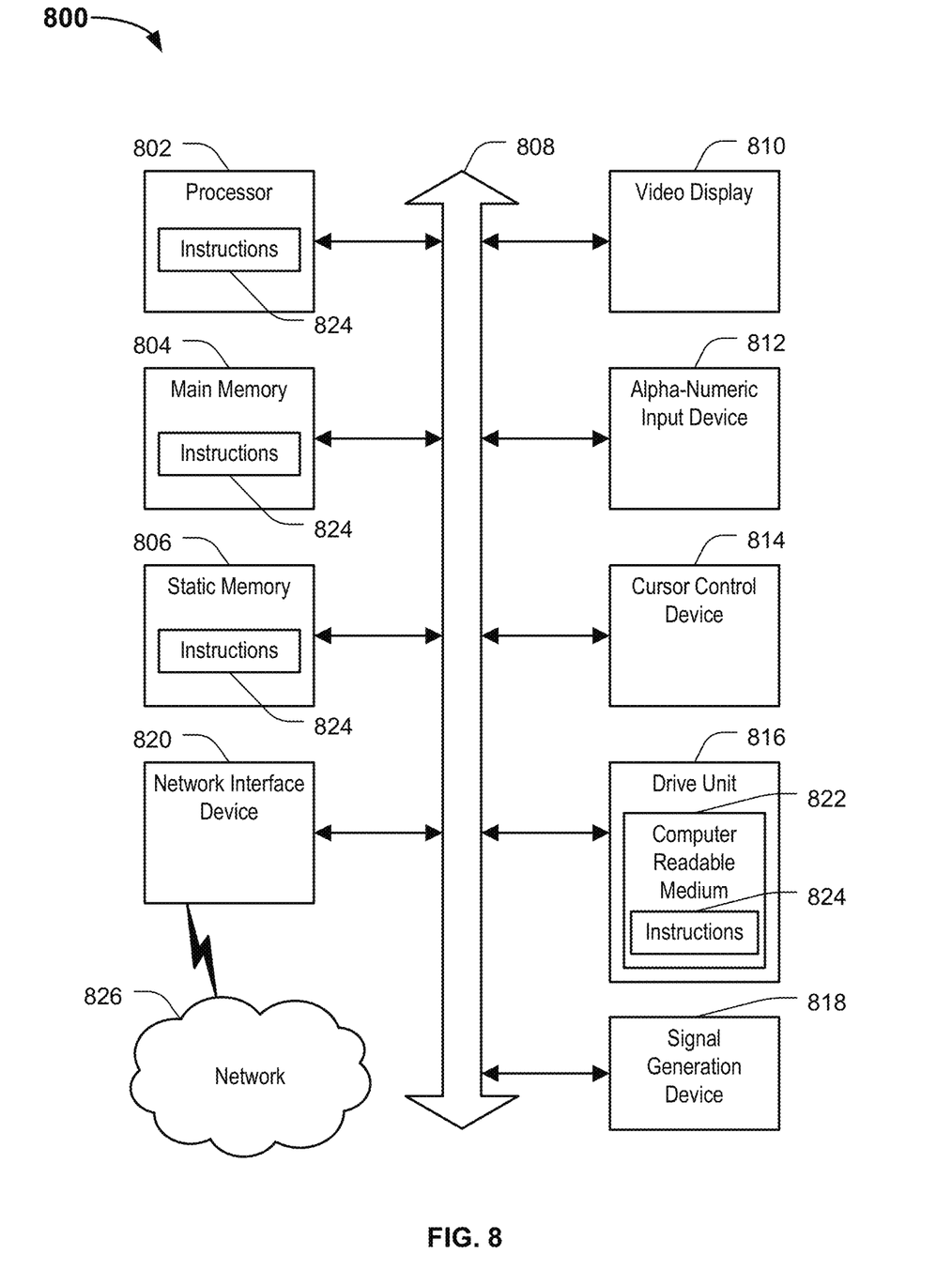
FIG. 8 depicts an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices. For example, the general computer system 800 may include or be included within any one or more of the components, devices, servers, repositories, and network elements illustrated in FIG. 1, FIG. 2, FIG. 3, and FIG. 7.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 800 can be implemented using electronic devices that provide video, audio or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, a projection display, a high definition television (HDTV) display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting exemplary embodiment, the computer-readable medium can include a solid-state memory, such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, communication standards (e.g., long-range wireless communication standards such as Third Generation (3G) or Fourth Generation (4G) cellular standards, or short-range wireless communication standards such as Bluetooth, 802.11x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving priority information at a device, wherein the priority information designates priorities of contacts and includes a first priority contact having a first priority and a second priority contact having a second priority;
receiving at the device, via a user interface of the device, first offer information associated with a good, a service, or a combination thereof from an offer originator, the first offer information specifying a first time period for acceptance of a first offer based on the first offer information;
receiving, via the user interface, second offer information associated with the good, the service, or the combination thereof from the offer originator, the second offer information specifying a second time period for acceptance of a second offer based on the second offer information;
after receiving the first offer information and the second offer information, receiving a request from the offer originator to distribute an offer associated with the good, the service, or the combination thereof;
in response to receiving the request to distribute the offer, automatically sending the first offer from the device to the first priority contact without sending the first offer to contacts having a lower priority than the first priority; and
upon detection by the device of expiration of the first time period without receiving an acceptance of the first offer from the first priority contact, automatically sending the second offer from the device to the second priority contact without sending the second offer to contacts having a lower priority than the second priority.

2. The method of claim 1, wherein the offer includes a particular request to receive the good, the service, or the combination thereof.

3. The method of claim 1, wherein the offer includes a particular offer to sell the good, the service, or the combination thereof.

4. The method of claim 1, wherein the first offer information is different from the second offer information.

5. The method of claim 4, wherein the first offer information includes a first price, and wherein the second offer information includes a second price.

6. The method of claim 1, wherein the second offer is not sent when acceptance of the first offer is received before the first time period expires.

7. The method of claim 1, wherein the priority information includes a third priority contact.

8. The method of claim 1, wherein the second offer is sent to the first priority contact.

9. The method of claim 1, wherein the priority information designates a third priority contact having a third priority, and further comprising:
receiving, via the user interface, third offer information from the offer originator, the third offer information specifying a third time period for acceptance of a third offer based on the third offer information; and
upon detection by the device of expiration of the second time period without receiving acceptance of the second offer, automatically sending the third offer from the device to the third priority contact without sending the third offer to contacts having a lower priority than the third priority.

10. The method of claim 9, wherein the third offer information is not sent to the third priority contact when acceptance of the second offer is received before the second time period expires.

11. The method of claim 1, wherein the first offer is sent to the first priority contact via at least one peer-to-peer connection, and wherein the second offer is sent to the second priority contact via an additional peer-to-peer connection.

12. A method comprising:
receiving priority information at a device, wherein the priority information designates priorities of contacts and includes a first priority contact having a first priority and a second priority contact having a second priority;
receiving at the device, via a user interface of the device, first offer information associated with a good, a service, or a combination thereof from an offer originator, the first offer information specifying a first time period for acceptance of a first offer based on the first offer information;
receiving, via the user interface, second offer information associated with the good, the service, or the combination thereof from the offer originator, the second offer information specifying a second time period for acceptance of a second offer based on the second offer information;
after receiving the first offer information and the second offer information, receiving a request from the offer originator to distribute an offer associated with the good, the service, or the combination thereof;
in response to receiving the request to distribute the offer, automatically sending the first offer from the device to the first priority contact without sending the first offer to contacts having a lower priority than the first priority;
upon detection by the device of expiration of the first time period without receiving an acceptance of the first offer from the first priority contact, automatically sending the second offer from the device to the second priority contact without sending the second offer to contacts having a lower priority than the second priority;
upon detection by the device of expiration of the second time period without receiving acceptance of the second offer, automatically sending a third offer based on third offer information from the device to a third priority contact without sending the third offer to contacts having a lower priority than a third priority; and
upon detection by the device of expiration of a third time period without receiving acceptance of the third offer, automatically sending an open offer from the device to a set of the contacts, wherein the open offer invites respondent conditions to accept the good, the service, or the combination thereof.

13. The method of claim 12, wherein the offer includes a sales offer, wherein the first offer information includes a first price, wherein the second offer information includes a second price, and wherein the second price is less than the first price.

14. The method of claim 12, wherein the offer includes a particular request from the offer originator to receive a particular service, wherein the first offer information includes a first price, wherein the second offer information includes a second price, and wherein the second price is greater than the first price.

15. A system, comprising:
a processor: and a memory accessible to the processor, the memory comprising instructions executable by the processor to perform operations including:

receiving priority information;

generating a prioritized list of contacts based on the priority information, wherein the prioritized list includes a first priority contact having a first priority and a second priority contact having a second priority;

receiving first offer information associated with a good, a service, or a combination thereof, the first offer information specifying a first time period for acceptance of a first offer based on the first offer information;

receiving second offer information associated with the good, the service, or the combination thereof, the second offer information specifying a second time period for acceptance of a second offer based on the second offer information;

receiving a request to distribute an offer associated with the good, the service, or the combination thereof;

in response to the request, automatically sending the first offer to the first priority contact without sending the first offer to contacts having a lower priority than the first priority; and upon expiration of the first time period without receiving acceptance of the first offer, automatically sending the second offer to the second priority contact without sending the second offer to contacts having a lower priority than the second priority.

16. The system of claim 15, wherein sending the second offer includes sending the second offer to the first priority contact.

17. The system of claim 15, wherein the processor is a processor of a server.

18. The system of claim 15, wherein the processor is a processor of a mobile communication device.

19. The system of claim 15, wherein generating the prioritized list comprises:

sending a query for contacts to a server; and receiving the prioritized list from the server.

20. The system of claim 15, wherein the priority information includes a plurality of factors, and wherein the plurality of factors includes a price factor, a location factor, an experience factor, a rating factor, a response history factor, or combinations thereof.

21. The system of claim 20, wherein each factor of the plurality of factors is associated with a distinct priority ranking.

22. The system of claim 21, wherein the distinct priority ranking is assigned by an offer originator.

* * * * *